July 2, 1940.  L. MARTON  2,206,415
METHOD OF MAKING ELECTRONIC PHOTOMICROGRAPHS
Filed Dec. 3, 1938
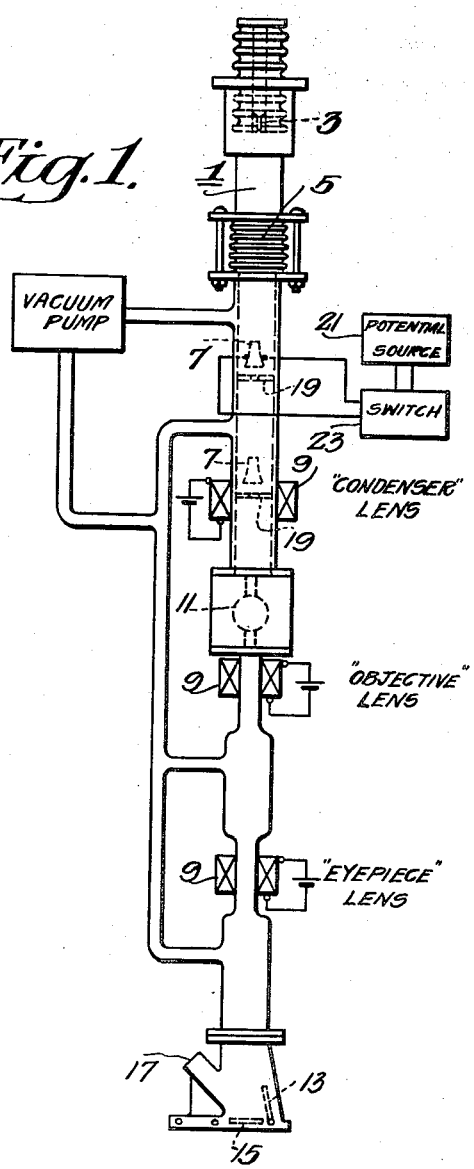
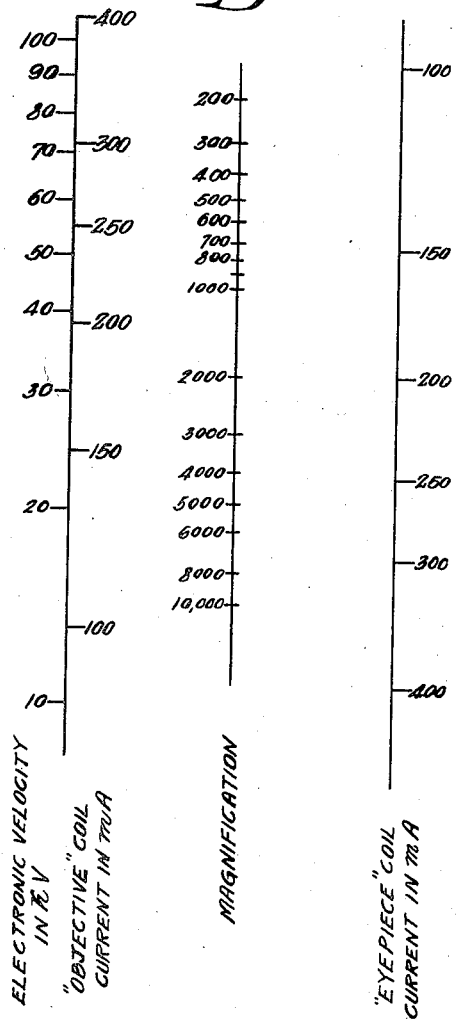
Inventor
Ladislaus Marton
By
Attorney Patented July 2, 1940

2,206,415

UNITED STATES PATENT OFFICE 2,206,415

METHOD OF MAKING ELECTRONIC PHOTOMICROGRAPHS

Ladislaus Marton, Collingswood, N. J., assignor to Radio Corporation of America, a corporation of Delaware Application December 3, 1938, Serial No. 243,747

7 Claims. (Cl. 178—6.7)

This invention relates to the method of making electronic photomicrographs, and more especially, to the method of making a photomicrograph of a specimen which may be modified by electronic bombardment.

It is known to those skilled in the art that electron beams may be focused on an object, passed through the object, and directed toward a fluorescent screen or photographically sensitized plate or element so that a magnified electron image of the specimen may be obtained. The energy involved in such process may be of the order of ten watts. This energy is concentrated on a very small area and the resulting electronic bombardment of the area may result in the destruction of a modification of the area if the bombardment continues for a long time. When a biological specimen is thus bombarded, it may either be destroyed or greatly modified. Such modification of the structure of the specimen tends to destroy the subject which is to be photographed.

In the past one of the methods of avoiding this difficulty has been to construct an object chamber for the microscope which permits focusing on a test object, which is later replaced by the specimen to be examined. Such substitution is accompanied by certain difficulties such as the uncertainty that the specimen to be examined occupies the same space as the test object and that the previous focus is the best for the specimen. Another method of avoiding this difficulty has been the use of very low bombardment currents. If the number of bombarding electrons is low, a longer exposure is required, which increases the difficulty of maintaining invaried operating conditions over the longer period of time. It follows that the difficulties previously encountered are due to the bombardment of the specimen during the focusing of the microscope and the subsequent bombardment during the exposure.

One of the objects of this invention is to provide a method of making electronic photomicrographs which reduce the bombardment of the specimen to be photographed to a minimum. Another object of the invention is to arrange an electronic microscope so that its magnification and focusing may be predetermined without subjecting the specimen to electronic bombardment and thereafter expose the specimen. A further object is to provide a system for making photomicrographs of biological specimens in which the electronic microscope is arranged at a predetermined operating parameter without exposing the specimen to the focusing and in which the exposure is of very brief duration.

The invention will be described by reference to the accompanying drawing in which Figure 1 represents an embodiment of an electron microscope; and Figure 2 is a graph indicating the operating parameters of the microscope.

It should be understood that the method of this invention is not limited to the precise form of the microscope which has been chosen by way of example rather than limitation. It also follows that the graph of the operating parameters represents one microscope and that similar characteristics may be determined for other microscopes of the same or different species.

Referring to Fig. 1, an electron microscope is arranged within the envelope 1. The envelope includes a cathode 3 or other suitable source of electrons and a flexible coupling 6 which permits centering the electron beam. It should be understood that centering may be accomplished by magnetic, electrical or mechanical means. The microscope includes deflecting plates 7 and magnetic focusing fields 9 which correspond to condenser, objective and "eyepiece" lenses. The object chamber is represented by the circle 11. At the base of the microscope is arranged a fluorescent screen 13 which may be replaced by a photographically sensitive plate or element 15. If the fluorescent screen is used, it may be examined by a suitable optical system 17. The microscope includes diaphragms 19 which limit the area of the electron beam. It should be understood that the foregoing arrangement of microscope is chosen to illustrate the method employed. The focusing may be accomplished by electric fields or magnetic fields or both types. Furthermore, the beam deflecting mechanism may include control grid electrodes or other types of beam deflectors. In the arrangement shown the deflecting plates are connected to a source of potential 21 and a timing switch 23. The timing switch is arranged so that it may be adjusted to operate over predetermined short-time intervals.

Since it is desirable to avoid focusing the electron beam on the specimen, except during the actual required exposure, it is necessary to determine the currents in the focusing coils as a function of the beam velocity and different magnifications. While it is possible to study the separate optical properties of the coils employed, such individual study may be avoided by calibrating the microscope as a whole. The total magnification is the product of the magnifications of the electron lenses employed:

$$G = g_1 . g_2 = (b_1/a_1)(b_2/a_2) \quad (1)$$

where $a_1$ is the object distance, $b_1$ the image distance of the first lens, hereinafter designated as the "objective," and $a_2$, $b_2$ are the corresponding distances of the second lens, hereinafter called the "eye-piece." Assuming that the position of the principal planes of my magnetic lenses does not vary with the focal length (which is true in the first approximation as long as the iron used for the enclosing of the coils and for the construction of the pole shoes is far from saturated), $a_1$ and $b_2$ become constants. In electronic microscopy the position of the object with respect to the lens is generally fixed and the focusing is carried out by varying the focal length of the lenses. On the other hand, the sum $a_2+b_1$ represents the fixed distance D between the eye-piece and the objective, $a_1+b_1+a_2+b_2$ the total length of the microscope L. To distinguish the variables from the constants make $a_1=A$ and $b_2=B$. Then the focal length of the objective is:

$$f_1 = AD/(A+D+B/G) \quad (2)$$

B/G being small compared with A+D (except for very small magnifications), $f_1$ is practically constant, i. e. for the focusing of the "objective," the current $I_{obj}$ is independent of the magnification and the latter depends, for a given velocity, only on the current of the "eye-piece" coil. It is known, on the other hand, that the focal length of a magnetic lens is given (taking account of the relativistic correction for high velocities) by $$\int_{-\infty}^{+\infty} f = \frac{4v_z^2}{\left(\frac{e}{m}\right)^2 \left(1 - \frac{v_z^2}{c^2}\right) \int_{-\infty}^{+\infty} H_z^2 dz} \quad (3)$$

where $v_z$ is the velocity of the electron in the direction of the z-axis, $e$ the charge, $m$ the mass of the electron, $c$ the velocity of light and $H_z$ the z-component of the magnetic field H. An unenclosed coil whose length is small compared with the effective diameter $d$, the focal length $f$ may be expressed as:

$$f = \frac{1}{3\pi^3}\left(\frac{2c}{e/m}\right)^2 \left[\frac{2e/m}{c^2}V + \left(\frac{e/m}{c^2}V\right)^2\right] \frac{d}{(It)^2} \quad (4)$$

which, substituting numerical values and simplifying, becomes $$f = 48,500(V + V^2/1000) . d/(It)^2 \quad (4a)$$

where V is the velocity expressed this time in electrons and $It$ is the number of ampere turns. For the case or iron-enclosed coils, it may be shown that the focal length may obey the general law $$f = \alpha(V + V^2/1000) . 1/I^\beta \quad (5)$$

where $\alpha$ and $\beta$ depend on the field distribution and must be determined experimentally for every configuration.

While the foregoing mathematical theory has been set forth as an aid to understanding the invention, it should be understood that the operating parameters of an electron microscope may be determined by plotting a number of values of $I_{obj}$ as a function of V and calculating the constants by the method of least squares. This calculation ($f_1$ approximated by a constant) gives the following result for one practical electron microscope:

$$113.96(V + V^2/1000) . 1/I_{obj}^{1.589} \quad (6)$$

(V in $kV$, $I_{obj}$ in $mA$).

The relation between the magnification and the current of the "eyepiece" coil and the velocity of the electrons can be determined in a similar fashion. The focal length of the eyepiece $$f_2 = BD/(AG+B+D) \quad (7)$$

may be set equal to the expression $$f_2 = \gamma(V + V^2/1000) \ 1/I_{oc}^\partial \quad (8)$$

It being given that the construction of the "objective" and "eyepiece" coils are identical in the practical case which has been cited, it can be assumed that $\partial$ is equal to $\beta$ and $$I_{oc}^{1.589} = \gamma(V + V^2/1000)(AG+B+D)/BD \quad (9)$$

A series of measurements of $I_{oc}$ as a function of G and of V indicates that the numerical value of $\gamma = 2200$. On the other hand, substituting the numerical values A=17 mm., B=804 mm., D=717 mm., it follows that:

$$I_{oc}^{1.589} = 0.065(V + V^2/1000)(G+89,5) \quad (9a)$$

The sum total of these results is represented in Fig. 2 in the form of a chart or graph. A straight edge placed across the chart indicates a given lens adjustment for the velocity and magnification chosen. The condenser coil may be calibrated in a similar manner. By thus preadjusting the parameters, it is practical to take photomicrographs without visual observation.

Thus, it is possible to prepare the specimens in a manner well known to those skilled in the art and to adjust the operating characteristics of the microscope in accordance with the predetermined focusing conditions. During the time of such adjustments, the electron beam is deflected away from the specimen. After the focus has been set in accordance with the degree of magnification chosen and the electron velocity, the beam is quickly directed toward the specimen for an interval which may vary from a few tenths of a second to a few microseconds, which has been found sufficient for a suitable photograph exposure. In this manner, the exposure time is so short that it is possible to avoid a deleterious modification of the subject under examination. In practicing the method, it has been found desirable to apply a potential which has a square wave form during the instant of exposure. It is practical to still further reduce the bombardment by making the initial magnification relatively small, and by using a fine-grained photographic emulsion and suitably chosen developers. The photographs may be afterwards enlarged.

I claim as my invention:

1. The method of making electronic photomicrographs of a specimen by means of an electron microscope which includes determining the operating parameters of said microscope for given magnification and focus, adjusting the operating parameters of said microscope to obtain said predetermined focus, keeping the electron beam of said microscope from bombarding the specimen, momentarily bombarding said specimen by said electron beam, and exposing a sensitized emulsion to the electronic image of said specimen.

2. The method of making electronic photomicrographs of a specimen by means of an electron microscope which includes determining the operating parameters of said microscope for given magnification and focus, forming an electron beam, preventing the electrons of said beam from bombarding said specimen, establishing the operating parameters of said microscope to obtain said predetermined focus, momentarily focusing said beam on said specimen, and exposing a sensitized element to the electronic image of the specimen upon which the beam is momentarily focused.

3. The method of making electronic photomicrographs of a specimen by means of an electron microscope which includes measuring the operating parameters of said microscope for a range of electron velocities and focus, creating an electron beam, diverting said beam from the region of said specimen, adjusting the focus and electron velocity of the beam of said microscope in accordance with said measurements, momentarily directing said beam to said specimen, and exposing a sensitized element to the electronic image of the specimen.

4. The method of photographing the image of a specimen momentarily bombarded with electrons which includes determining initially the operating parameters of said microscope for a range of magnification and focus, creating a beam of electrons of a velocity determined by said predetermined operating parameters, initially preventing said beam from reaching said specimen, adjusting the conditions of the focusing of said beam according to said predetermined parameters, momentarily focusing said beam on said specimen to thereby create an electron image of said specimen and photographing said image.

5. The method of photographing the image of a specimen which includes measuring the currents applied to the "objective" and "eyepiece" lenses to obtain a predetermined range of magnification and focus, establishing a supply of electrons, directing said electrons away from said specimen, adjusting "objective" and "eyepiece" lens currents to the said measured value to obtain said predetermined magnification and focus, adjusting the electron supply to the required electron velocity, momentarily bombarding said specimen with said electrons, and photographing the image of the thus bombarded specimen.

6. The method of photographing the image of a specimen by means of an electron microscope including condenser, objective and eyepiece lenses which includes the steps of measuring the currents applied to said condenser, "objective" and "eyepiece" lenses to obtain a predetermined set of current values required for a range of magnification and focus, creating an electron beam, preventing said electrons from bombarding said specimen, adjusting said condenser, said objective and said eyepiece lens currents to one of said predetermined set of values, momentarily focusing said beam on said specimen, and photographing the image.

7. The method of photographing the image of a specimen by means of an electron microscope including condenser, objective and eyepiece lenses, which includes the steps of initially observing the potentials applied to said lenses for predetermined degrees of magnification and focus, creating an electron beam of known velocity, diverting said beam from said specimen, adjusting the focus of said lenses by applying said initially observed potentials, momentarily focusing said beam on said specimen, and photographing the image of the specimen.

LADISLAUS MARTON.